Oct. 28, 1924.                                         1,513,238
                       W. M. GROSS
            LOADING AND EXCAVATING WHEELBARROW
                   Filed July 3, 1923         3 Sheets-Sheet 1
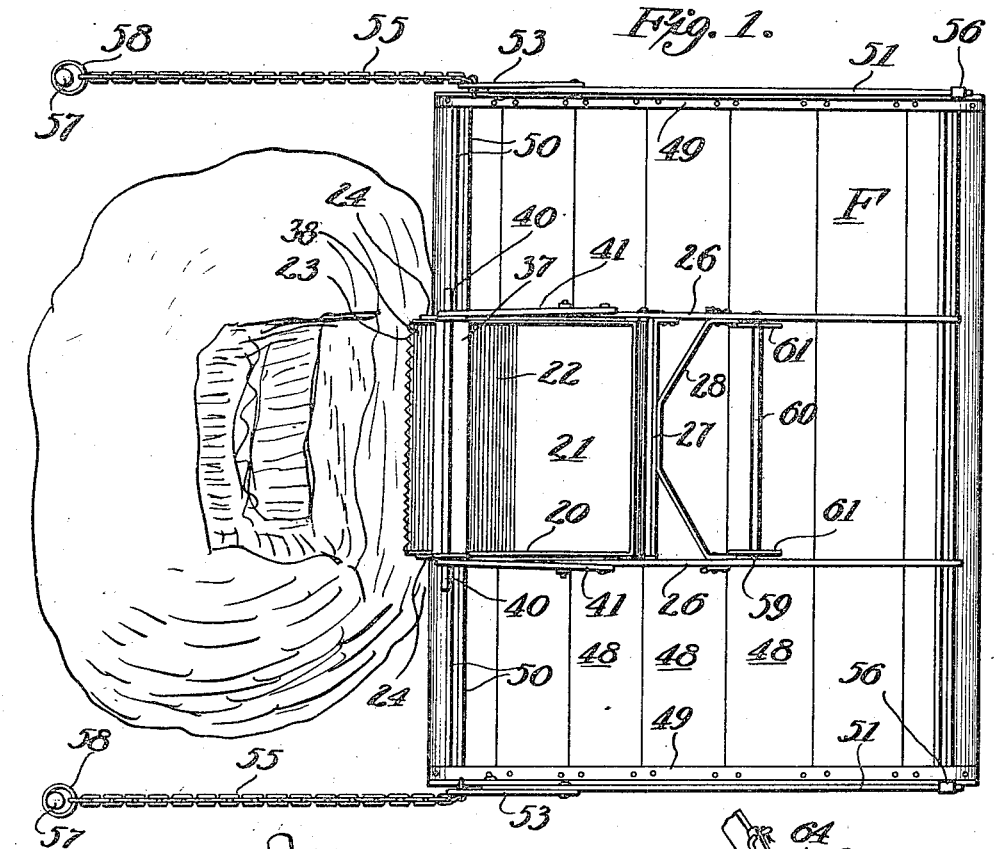
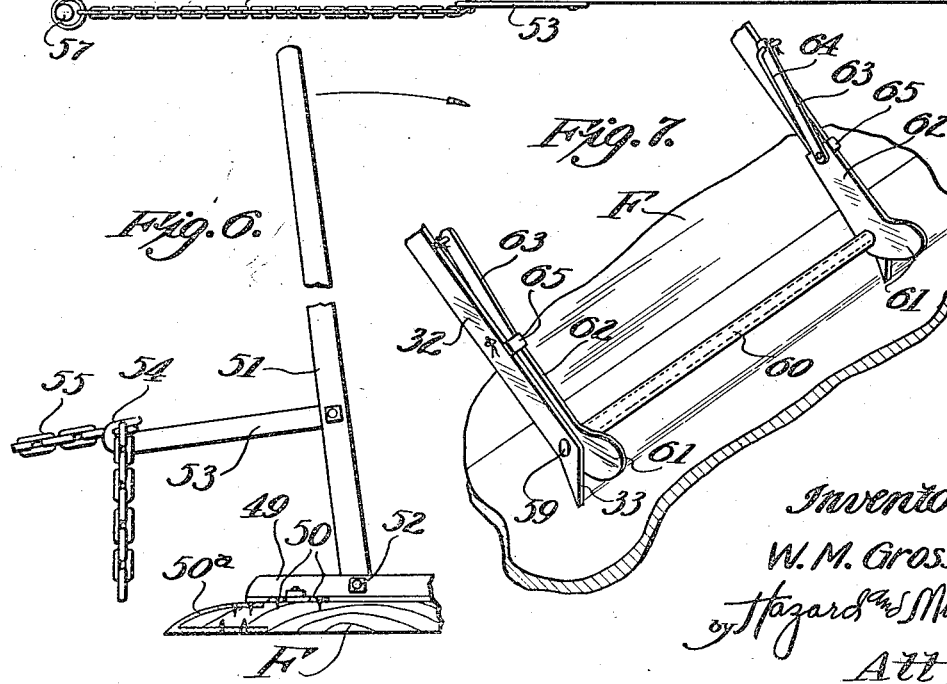
Inventor
W. M. Gross
by Hazard and Miller
Att'ys

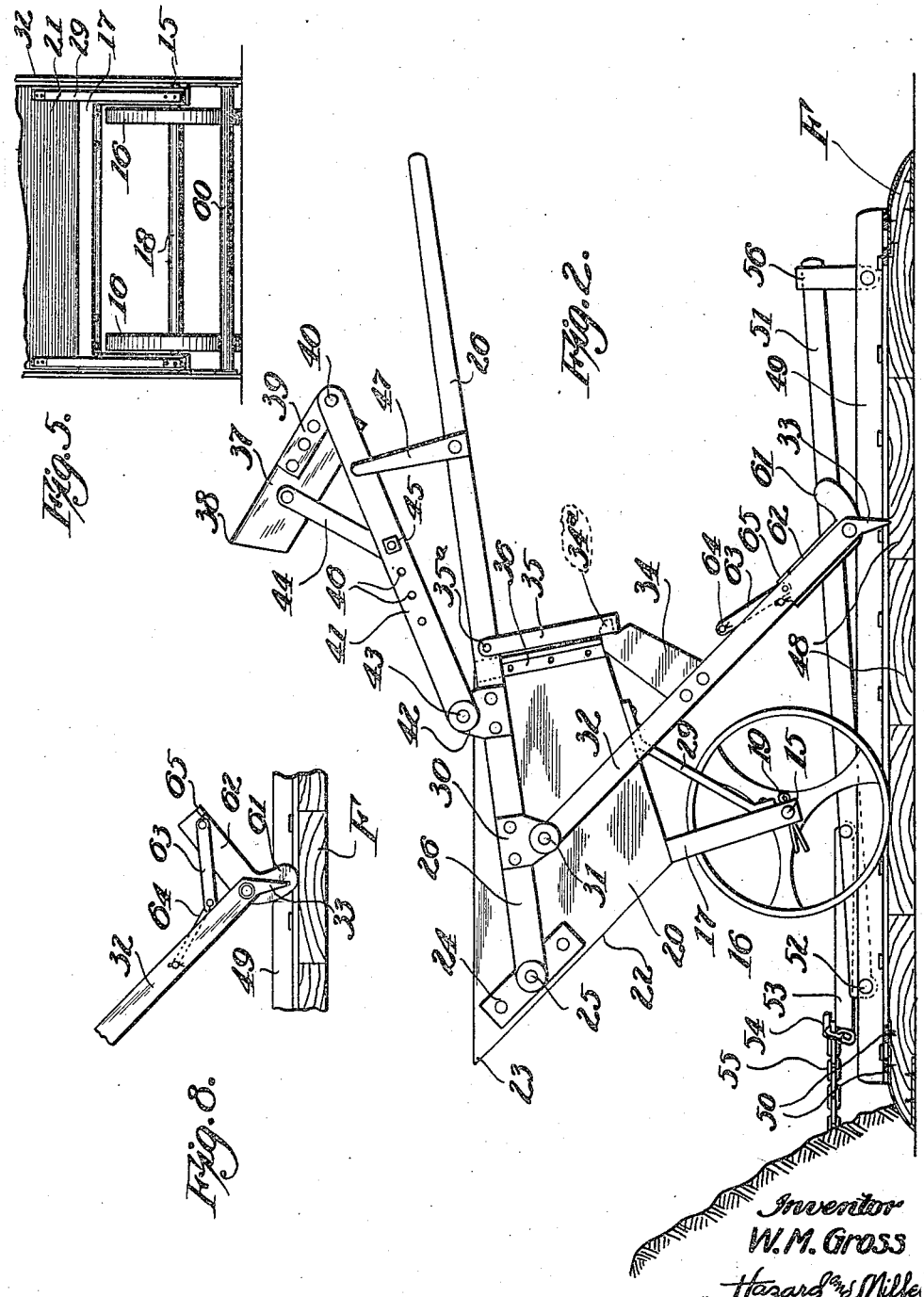

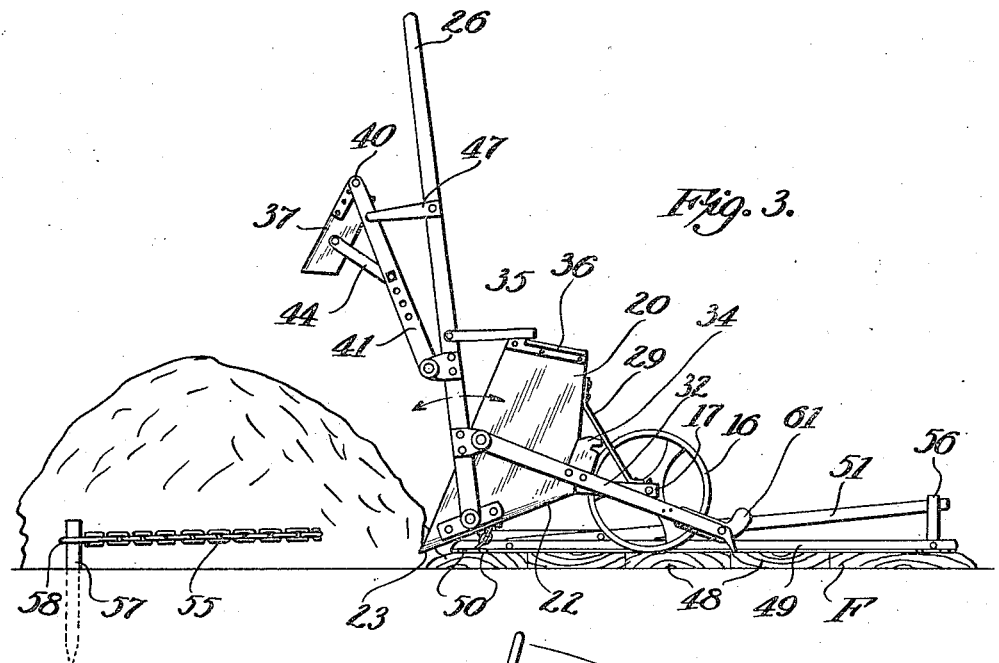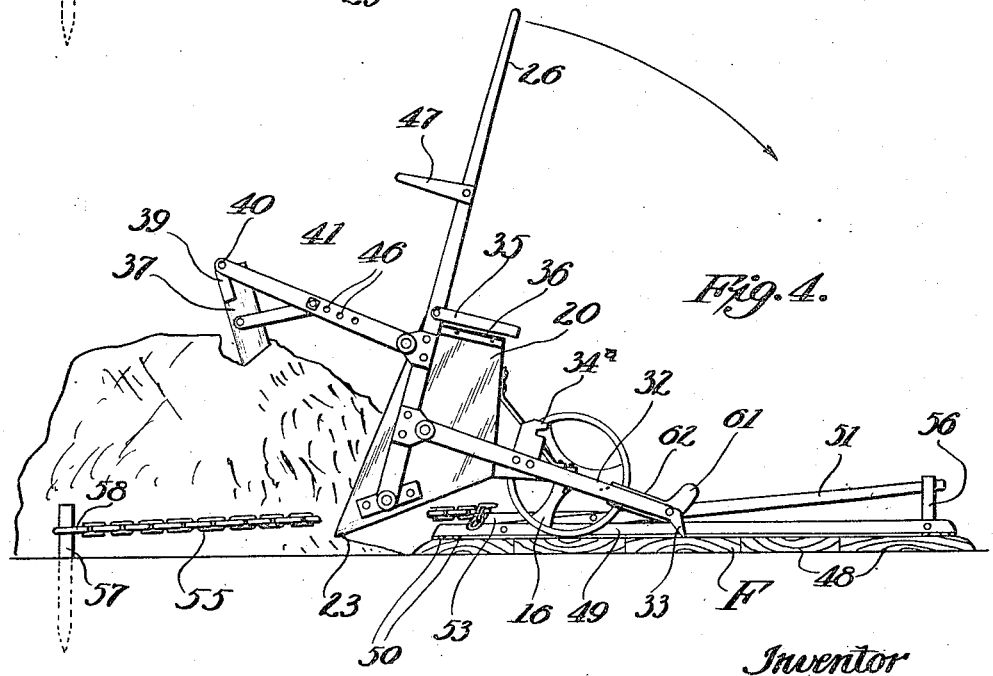

Patented Oct. 28, 1924.

1,513,238

UNITED STATES PATENT OFFICE.

WILLIAM M. GROSS, OF LAS VEGAS, NEVADA.

LOADING AND EXCAVATING WHEELBARROW.

Application filed July 3, 1923. Serial No. 649,230.

*To all whom it may concern:*

Be it known that I, WILLIAM M. GROSS, a citizen of the United States, residing at Las Vegas, in the county of Clark and State of Nevada, have invented new and useful Improvements in Loading and Excavating Wheelbarrows, of which the following is a specification.

My invention relates to wheelbarrows and a purpose of my invention is the provision of a wheelbarrow having improved means for effecting the self loading thereof, and a platform adapted for use in conjunction with the wheelbarrow to facilitate the self loading thereof.

I will describe one form of wheelbarrow and platform each embodying my invention, and will then point out the novel features thereof in claims.

In the accompanying drawings,

Fig. 1 is a view showing in top plan one form of wheelbarrow and platform embodying my invention in operative position with respect to a quantity of material to be loaded.

Fig. 2 is a view showing in side elevation the wheelbarrow in load carrying position, and the platform in section.

Figs. 3 and 4 are views showing in side elevation the wheelbarrow and platform with the former in loading positions with respect to the material to be loaded.

Fig. 5 is a fragmentary view of the wheelbarrow showing in rear elevation the body supporting means.

Fig. 6 is a fragmentary sectional view of the platform shown in the preceding views and one of the securing means thereof.

Fig. 7 is a fragmentary perspective view of the pawl elevating means comprised in the wheelbarrow shown in the preceding views.

Fig. 8 is a view showing in side elevation one of the pawl elevating means in active position with respect to the platform.

Similar reference characters refer to similar parts in each of the several views.

Referring specifically to the drawings, the wheelbarrow embodying my invention comprises an axle 15 (Fig. 5) upon the ends of which are journal wheels 16 maintained in definite spaced relation by a spacing sleeve 18 and secured against removal by pins 19. These pins 19 also serve to secure the parallel portions of a U-shaped frame 17 to the ends of the axle and in such manner that the frame is mounted for swinging movement. A body 20 is secured upon the horizontal portion of the frame 17 and, as clearly shown in Fig. 2, this body is provided with a flat bottom 21 and an inclined side 22 having its upper edge serrated to form teeth 23.

Plates 24 are riveted or otherwise secured to the opposite sides of the body 20, and these plates are provided with pins or stub axles 25 upon which are pivoted the forward ends of operating arms 26 rigidly connected to each other for simultaneous movement by means of a connecting bar 27 and a brace bar 28 (Fig. 5). Brace bars 29 are employed to provide a rigid connection between the body 20 and the frame 17. The arms 26 have riveted thereto plates 30 carrying pivot pins 31 to which the upper ends of arms 32 are connected, such arms having their lower ends constructed to provide pawls 33. Secured to the arms 32 at points intermediate their ends are latches 34 having bills 34$^a$ adapted to be engaged by keepers 35 pivoted at the points indicated at 35$^a$ to the arms 26. These keepers 35 operate in conjunction with the latches 34 to retain the arms 26 as well as the pawls 33 in fixed relation to the body 20, it being particularly noted that angle bars 36 are secured to the body 20 so that when the latter is in load carrying position, as shown in Fig. 2, such bars repose upon the latches 34 so that if the keepers engage the bills 34$^a$ the body will be firmly held in contact with the latches and the arms 26 secured against movement with respect to the latches.

The arms 26 carry an auxiliary filling member 37 which is of a length corresponding substantially to the width of the body 20, while its forward edge 38 is serrated to provide teeth to facilitate the member penetrating the material to be loaded. Plates 39 are secured to the opposite ends of the member 37, and these plates project from the rear edge of the member 37 to provide ears to receive the opposite ends of a rod 40. Fixed to the ends of the rod 40 are arms 41 pivotally connected at their forward ends to the arms 26 by means of plates 42 and pivot pins 43. These arms 41 carry bars 44 secured at one end to the member 37 and adjustably secured to the arms 41 at the other end by means of bolts 45 which are adapted to extend through any one of a plurality of openings 46. It will be understood that through an adjustment of the bars 44 the angular position of the member 37 with respect to the arms 41 can be varied as desired, so that in the active position of the auxiliary filling member, as shown in Fig. 4, it will penetrate the material to be loaded at any preferred angle depending upon the character of material to be loaded and the amount of material to be moved into the body at each loading operation. The arc of movement of the filling member can also be varied by varying the length of the ears 41 and consequently the distance of the pivot pins 43 from or above the body 20.

The member 37 is adapted to be retained in an inactive position, as shown in Fig. 2, by means of spring latch bars 47 secured to the arms 26 and having curved ends adapted to frictionally engage the arms 41 so that when the arms 26 are swung forwardly to the position shown in Fig. 3, the latch bars will retain the member 37 against falling to the position shown in Fig. 4.

The wheelbarrow is adapted to be used in conjunction with a platform designated generally at F, such platform in the present instance being made up of a plurality of boards 48 arranged in edge to edge formation with the outer edges of the two outermost boards slightly tapered, as shown in Fig. 2, for the purpose of facilitating the movement of the wheelbarrow to and from the platform. The boards 48 are secured in edge to edge relation by means of angle bars 49 secured to the upper sides of the boards, as clearly shown in Fig. 1. Adjacent the forward edge of the platform a plurality of strips 50 are secured in spaced relation to each other and for the purpose of providing abutments for the pawls 33 should there be an occasion arise in which the wheelbarrow is adapted to normally repose in advance of the platform so that the pawls engage the platform adjacent its forward edge. As shown in Fig. 6, the forward edge of the platform F is covered with a metal plate 50ª to protect the edge as will be understood. Levers 51 are pivoted on angle bars 49 at points indicated at 52, and these levers carry pivoted links 53 formed with hooks 54 adapted to engage chains 55. The levers 51 are normally secured in the position shown in Fig. 2 by means of keepers 56 pivoted on the angle bars 49 adjacent to the rear edge of the platform. Pegs 57 are adapted to be driven into the ground at opposite sides of the quantity of material to be loaded, and these pegs are engaged by rings 58 secured to the free ends of the chains 55.

As shown in Figs. 2 and 7, the arms 32 are rigidly connected at points adjacent the pawls 33 by means of a rod 59 upon which is loosely mounted a sleeve 60. Fixed to the ends of the sleeve 60 are cams 61 provided with shanks 62 to which links 63 are connected. Connected to the links 63 are rods 64 and the latter in turn are pivotally mounted on the arms 32 to allow swinging movement of the cams and shanks. Lips 65 are formed to the shanks 62 to limit the movement thereof in the direction of the arms 32. In this position of the shanks, the upper ends of the links 63 project rearwardly from the arms 32 so that they may be readily engaged by the hand or foot to force the same downwardly in moving the cam 61 to active position for elevating the pawls 33 out of engagement with the platform F.

The operation of the wheelbarrow and platform is is follows:

By reference to Fig. 2, it will be seen that the wheelbarrow is reposing on the platform F with its body 20 in normal or load carrying position, and the operating arms 26 latched in fixed relation to the body. In order to effect a loading of the wheelbarrow, it is advanced over the platform and toward the material to be loaded by first moving the keepers 35 out of engagement with the bills 34ª so as to free the arms 26 and thus permit the latter to be manipulated in effecting an operation of the arms 32 and the pawls 33. By gripping the operating arms 26 at their free ends and moving the same upwardly and forwardly, the body 20 is tilted forwardly about the axle 15 as a center, thereby causing movement of the arms 32 to advance the pawls 33 over the platform F. By now moving the operating arms rearwardly, a downward and rearward pressure is exerted upon the arms 32 to cause the pawls 33 to grip the platform F so that in the final rearward movement of the arms 26 the wheels 16 are advanced over the platform F to move the wheelbarrow as a unit in the direction of the material to be loaded. From this operation, it will be clear that by repeated movement of the operating arms, the pawls function to advance the body 20 while in tilted position, as shown in Fig. 3, so as to cause the forward edge of the body to penetrate the material to be loaded, as shown in Fig. 4, and thereby effect a filling of the body.

In the loading position of the body 20, as shown in Fig. 4, the auxiliary filling member 37 can now be released by forcing the arms 41 downwardly and free of the latch bars 47 so as to cause the member to penetrate the material to be loaded and to force a portion of such material into the body 20. In the lowermost position of the member 37, it serves to span the mouth of the body and thereby prevent discharge of the material from the body when the latter is returned to load carrying position, as shown in Fig. 2. The wheelbarrow may now be moved from the platform by first latching the operating arms 26 in fixed position with respect to the body 20, and then rotating the cams 61 so as to elevate the pawls 33 free of the platform F, as shown in Fig. 8.

It will be particularly noted that when the wheel-barrow is in load carrying position, the arms 32 cooperate with the wheels in effectively supporting the body, while by slightly tilting the body forwardly the arms 32 will be elevated to permit movement of the wheelbarrow from place to place on the wheels.

It will, of course, be understood that the employment of the platform F is not absolutely necessary to the successful operation of the wheelbarrow, but when employed such platform provides a firm base for the wheelbarrow and an efficient gripping surface for the pawls 33. When employing the platform it is necessary from time to time to advance the platform as the material is loaded so that it will occupy the proper position for supporting the wheelbarrow. To retain the platform against movement during the loading operation, and to effect advancement thereof when necessary, the chains 55, levers 51, pegs 57, and links 53 are employed. When securing the platform against rearward movement the pegs are driven into the ground on opposite sides of the material to be loaded and the chains extended from the pegs and held taut by means of the links 53 and the hooks 54, it being understood that the levers 51 are secured in horizontal position by the keepers 56. When advancing the platform, it will be clear that by elevating the levers 51 from the position shown in Fig. 2 to that shown in Fig. 6, the links 51 will be moved to engage advanced links of the chains, while the downward movement of the levers will effect a pulling action on the chains to cause the forward movement of the platform.

Although I have herein shown and will describe only one form of wheelbarrow and one form of platform each embodying my invention, it is to be understood that various changes and modifications may be made herein without departing from the spirit of the invention and the spirit and scope of the appended claims.

What I claim is:

1. In combination, a platform adapted for arrangement adjacent a body of material to be loaded, abutments on the platform, a wheelbarrow, comprising a body supported for movement to occupy loading and dumping positions, means carried by the body and engageable with said abutments for effecting a forward and step by step movement of the wheelbarrow, and means for advancing the platform for the purpose described, said means including levers pivotally mounted on the platform, chains connected to the levers, and stakes adapted to connect the chains to the ground.

2. In combination, a platform adapted for arrangement adjacent a body of material to be loaded, abutments on the platform, a wheelbarrow, comprising a body supported for movement to occupy loading and dumping positions, arms movable on the body, and pawls movable on the arms and adapted for engagement with the abutments whereby when the arms are rocked with the body in loading or carrying position the pawls will function to cause a forward movement of the wheelbarrow relative to the platform to effect the loading of the body.

3. A wheelbarrow, comprising an axle, wheels on the axle, a body pivotally sustained on the axle to occupy loading and dumping positions, arms pivoted on the body to occupy active and inactive positions, means for latching the arms in the inactive position, pawls pivoted on the arms and adapted for engagement with the ground to effect forward movement of the wheelbarrow when the arms are moved from the active position to the inactive position with the body in loading position, and means adapted to engage the ground for elevating the pawls out of engagement with the ground.

4. A wheelbarrow, comprising a body having an inclined front wall, teeth formed on the forward edge of the front wall, means for supporting the body for pivotal movement to occupy loading and carrying positions, arms pivoted on the body at the sides of its forward end to occupy active and inactive positions, means for latching the arms in the inactive position, pawls pivotally sustained on the arms, means operable by movement of the body to cause said pawls to engage or disengage the ground, an auxiliary filling member pivotally and adjustably sustained on the arms, and means for latching the filling member against movement on the body.

5. A wheelbarrow, comprising a body supported for pivotal movement to occupy loading and carrying positions, arms pivoted on the body, pawls pivoted on the arms and adapted for engagement with the ground whereby, when the arms are rocked with the body in loading or carrying position the pawls will function to cause a forward movement of the wheelbarrow to effect the loading of the body, and cams for supporting the pawls out of engagement with the ground to allow unrestricted movement of the wheelbarrow.

In testimony whereof I have signed my name to this specification.

WILLIAM M. GROSS.